United States Patent
Li et al.

(10) Patent No.: US 12,405,830 B2
(45) Date of Patent: Sep. 2, 2025

(54) DYNAMIC CPU CORE SHARING

(71) Applicant: Dell Products L.P., Hopkinton, MA (US)

(72) Inventors: Ningdong Li, Acton, MA (US); Robert Lucey, Whitechurch (IE); James McGillis, Franklin, MA (US); Peng Yin, Southborough, MA (US); Rong Yu, West Roxbury, MA (US)

(73) Assignee: Dell Products L.P., Hopkinton, MA (US)

( * ) Notice: Subject to any disclaimer, the term of this patent is extended or adjusted under 35 U.S.C. 154(b) by 498 days.

(21) Appl. No.: 18/159,109

(22) Filed: Jan. 25, 2023

(65) Prior Publication Data

US 2024/0248766 A1    Jul. 25, 2024

(51) Int. Cl.
G06F 9/50    (2006.01)

(52) U.S. Cl.
CPC .......... *G06F 9/5044* (2013.01); *G06F 9/5083* (2013.01)

(58) Field of Classification Search
CPC ...... G06F 9/5044; G06F 9/5083; G06F 9/505; G06F 2209/5011
See application file for complete search history.

(56) References Cited

U.S. PATENT DOCUMENTS

| | | | |
|---|---|---|---|
| 2018/0027066 A1* | 1/2018 | Van De Groenendaal | H04L 49/25 |
| 2020/0356292 A1* | 11/2020 | Ippatapu | H04L 41/16 |
| 2021/0224138 A1* | 7/2021 | Wang | G06F 9/546 |
| 2021/0311852 A1* | 10/2021 | Doddaiah | G06F 11/3485 |
| 2021/0349762 A1* | 11/2021 | Kamran | G06F 11/3024 |

\* cited by examiner

*Primary Examiner* — Sisley N Kim
(74) *Attorney, Agent, or Firm* — Anderson Gorecki LLP

(57) ABSTRACT

Emulation modules running on a single-board compute node have allocations of cores of a multi-core processor. The emulation modules are configured to donate underutilized cores or available CPU cycle units to a shared pool that can be used by other emulation modules running on the board. Emulation modules that require additional processing resources borrow cores or CPU cycle units from the shared pool. The emulation modules dynamically donate and retract cores or CPU cycle units from the shared pool based on utilization of allocated cores.

20 Claims, 3 Drawing Sheets

|  | CPU Cycle Units Donated | Donated CPU Cycle Units Borrowed |
|---|---|---|
| Frontend Module | 3 | 2 |
| Backend Module | 0 | 0 |
| IO Services Module | 0 | 0 |

Figure 2

DYNAMIC CPU CORE SHARING

TECHNICAL FIELD

The subject matter of this disclosure is generally related to electronic data storage systems.

BACKGROUND

Electronic data storage systems such as Network-Attached Storage (NAS), Storage Area Networks (SANs), and storage arrays are often used to maintain data for instances of host applications that run on host servers. Examples of host applications may include, but are not limited to, multi-user software for email, accounting, inventory control, manufacturing, engineering, and a wide variety of other organizational functions. Access to the host application data is managed by storage servers or storage-specialized computing nodes.

SUMMARY

An apparatus in accordance with some implementations comprises: at least one compute node configured to manage access to an array of non-volatile drives, the at least one compute node comprising at least one multi-core processor with a first set of cores that are allocated to an input-output (IO) services emulation module running on the compute node, a second set of cores that are allocated to a frontend emulation module running on the compute node, and a third set of cores that are allocated to a backend emulation module running on the compute node; the IO services emulation module configured to monitor utilization of the first set of cores by the IO services emulation module and donate processing resources to a shared pool responsive to the first set of cores being underutilized by the IO services emulation module; the frontend emulation module configured to monitor utilization of the second set of cores by the frontend emulation module and donate processing resources to the shared pool responsive to the second set of cores being underutilized by the frontend emulation module; the backend emulation module configured to monitor utilization of the third set of cores by the backend emulation module and donate processing resources to the shared pool responsive to the third set of cores being underutilized by the backend emulation module; the processing resources donated to the shared pool being accessible to the IO services emulation module, the frontend emulation module, and the backend emulation module for running threads.

A method in accordance with some implementations comprises: allocating a first set of cores of a multi-core processor of a compute node of a storage system to an input-output (IO) services emulation module running on the compute node; allocating a second set of cores of the multi-core processor to a frontend emulation module running on the compute node; allocating a third set of cores of the multi-core processor to a backend emulation module running on the compute node; monitoring, by the IO services emulation module, utilization of the first set of cores by the IO services emulation module and donating processing resources to a shared pool responsive to the first set of cores being underutilized by the IO services emulation module; monitoring, by the frontend emulation module, utilization of the second set of cores by the frontend emulation module and donating processing resources to the shared pool responsive to the second set of cores being underutilized by the frontend emulation module; and monitoring, by the backend emulation module, utilization of the third set of cores by the backend emulation module and donating processing resources to the shared pool responsive to the third set of cores being underutilized by the backend emulation module; wherein the processing resources donated to the shared pool are accessible to the IO services emulation module, the frontend emulation module, and the backend emulation module for running threads.

A non-transitory computer-readable storage medium in accordance with some implementations stores instructions that are executed by a storage system to perform a method comprising: allocating a first set of cores of a multi-core processor of a compute node of a storage system to an input-output (IO) services emulation module running on the compute node; allocating a second set of cores of the multi-core processor to a frontend emulation module running on the compute node; allocating a third set of cores of the multi-core processor to a backend emulation module running on the compute node; monitoring, by the IO services emulation module, utilization of the first set of cores by the IO services emulation module and donating processing resources to a shared pool responsive to the first set of cores being underutilized by the IO services emulation module; monitoring, by the frontend emulation module, utilization of the second set of cores by the frontend emulation module and donating processing resources to the shared pool responsive to the second set of cores being underutilized by the frontend emulation module; and monitoring, by the backend emulation module, utilization of the third set of cores by the backend emulation module and donating processing resources to the shared pool responsive to the third set of cores being underutilized by the backend emulation module; wherein the processing resources donated to the shared pool are accessible to the IO services emulation module, the frontend emulation module, and the backend emulation module for running threads.

This summary is not intended to limit the scope of the claims or the disclosure. Other aspects, features, and implementations will become apparent in view of the detailed description and figures. Moreover, all the examples, aspects, implementations, and features can be combined in any technically possible way.

BRIEF DESCRIPTION OF THE FIGURES

FIG. 2 illustrates a data structure for tracking shared CPU cycle units of one compute nodes.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
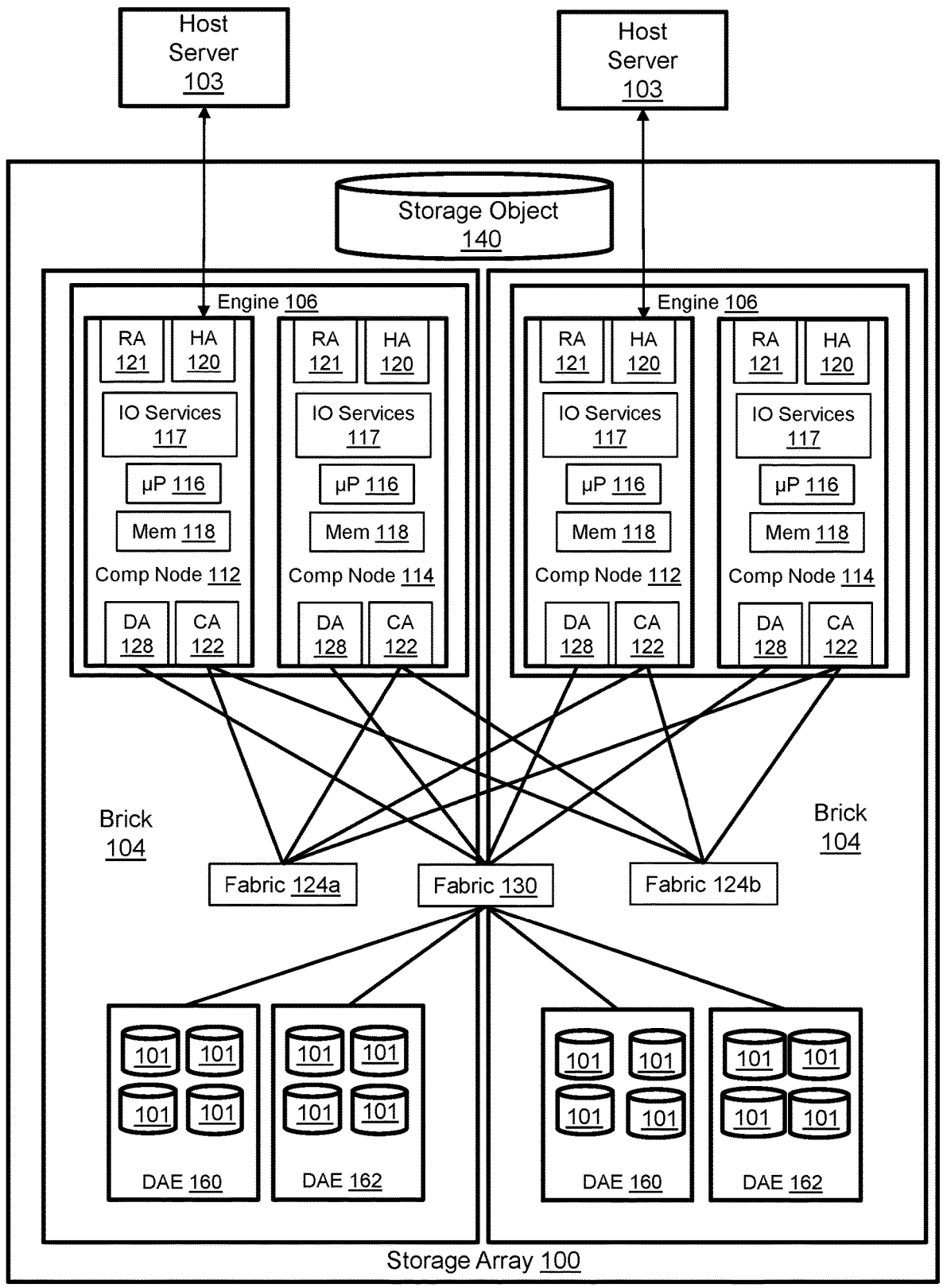
FIG. 1 illustrates a storage array in which dynamic CPU core sharing is implemented.

FIG. 1 illustrates a storage array 100 in which dynamic CPU core sharing is implemented. The storage array is depicted in a simplified data center environment with two host servers 103 that run host applications, but the storage array would typically support more than two host servers. The host servers 103 include volatile memory, non-volatile storage, and one or more tangible processors. The storage array 100 includes one or more bricks 104. Each brick includes an engine 106 and one or more drive array enclosures (DAEs) 160, 162. Each engine 106 includes a pair of interconnected, storage-specialized compute nodes 112, 114 that are arranged in a failover relationship and may be referred to as "storage directors" or "IO processing boards." Each compute node includes electronic hardware resources such as multi-core processors 116 and local memory 118. The processors include multiple dies in multiple sockets with central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by other compute nodes of the storage array via direct memory access (DMA). Managed drives 101 in the DAEs 160, 162 include non-volatile storage media such as solid-state drives (SSDs) based on EEPROM technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active backend. Every drive adapter 128 in the storage array can reach every DAE via the fabric 130.

Each compute node 112, 114 is implemented on a single printed circuit board (PCB) and includes emulation modules that may run on virtual machines or guest operating systems under a hypervisor or in containers. A frontend emulation module includes a host adapter (HA) 120 and a remote adapter (RA) 121. The host adapter handles communications with the host servers 103. The remote adapter (RA) 121 handles communications with other storage systems, e.g., for remote mirroring, backup, and replication. A backend emulation module includes a channel adapter (CA) 122 and a drive adapter (DA) 128. The channel adapter 122 handles communications with other compute nodes via redundant interconnecting InfiniBand fabrics 124a, 124b. The drive adapter 128 handles communications with managed drives 101 in the DAEs 160, 162. An IO services emulation module 117 performs a variety of functions in support of servicing IOs from the host servers. Each emulation module runs a variety of different processes and threads. The emulation modules running on each of the compute nodes have exclusive allocations of the local processor cores and local memory resources of that compute node, so different emulation modules are not free to access all local processor cores and memory resources without constraints. However, as will be explained below, the emulation modules are configured to selectively donate CPU cycle units to, and borrow CPU cycle units from, a shared pool that is accessible by all the emulation modules running on the same compute node. In other words, each emulation module may dynamically donate part of its CPU core allocation to the shared pool and borrow from CPU core allocations of other emulation modules running on the same PCB. Advantages of the technique may include more efficient utilization of processing resources and improved performance of the storage system.

Each emulation module on a single board (FA, DN, and EM) monitors its CPU cycle usage periodically to publish a CPU cycle credit and select a number of its CPU cores to be shared with other modules. The number of CPU cores selected is normally proportional to the credit. The module denoting the CPU cores may still allow its own threads to run on those CPU cores. It may also exclude some of its threads from running on these CPU cores or may adjust the frequency the threads can run on these CPU cores. All the CPU cores denoted by modules into this shared pool of CPUs are attached with an additional tag, i.e., Shared-CPU-tag. A module that needs additional CPU cycles monitors the total available CPU cycle credits of the shared CPU core pool, and takes a portion or all of the available credits and allows some of its existing or newly activated threads to be associated with the "Shared-CPU-tag," so that these threads can be scheduled to run on those shared CPU pool by the storage array operating system (OS). The number of those threads and how often they should be scheduled as defined by the OS pie-count, should be proportional to the CPU cycle credits taken by this module.

Data associated with instances of the host applications running on the host servers 103 is maintained on the managed drives 101. The managed drives are not discoverable by the host servers, but the IO services emulation modules create a logical storage object 140 that can be discovered and accessed by the host servers. Without limitation, the storage object may be referred to as a source device, production device, production volume, or production LUN, where the logical unit number (LUN) is a number used to identify logical storage volumes in accordance with the small computer system interface (SCSI) protocol. From the perspective of the host servers 103, the storage object 140 is a single disk drive having a set of contiguous fixed-size logical block addresses (LBAs) on which data used by the instances of the host application resides. However, the host application data is stored at non-contiguous addresses on various managed drives 101. The IO services emulations 117 maintain metadata that maps between the logical block addresses of the storage object 140 and physical addresses on the managed drives 101 in order to process IOs from the hosts.

FIG. 2 illustrates a data structure for tracking shared CPU cycle units of one compute node. A CPU cycle unit is an array-standardized number of CPU cycles per unit time, e.g., the CPU cycles per second used by a typical thread running on one of the emulation modules. CPU cycle unit size may differ between storage arrays. There are two entries in the data structure for each emulation module. A first entry indicates the number of CPU cycle units that have been donated by that emulation module. The second entry indicates the number of the donated CPU cycle units that have been borrowed by other emulation modules. The number of donated CPU cycle units of a given emulation module that have been borrowed by other emulation modules must be equal to or less than the number of CPU cycle units that have been donated by that emulation module. The number of CPU cycles donated by an emulation module is incremented when that emulation module publishes a new CPU cycle unit as being available for sharing. The number of CPU cycles donated by an emulation module is decremented when that emulation module unpublishes a CPU cycle to remove it from the shared pool. The number of donated CPU cycle units borrowed from an emulation module is incremented when a CPU cycle unit is borrowed by another emulation module. The number of donated CPU cycle units borrowed from an emulation module is decremented when a borrowed CPU cycle unit is returned by another emulation module. The data structure enables emulation modules to determine whether CPU cycle units are available to be borrowed from other emulation modules running on the same PCB.

Figure 3:
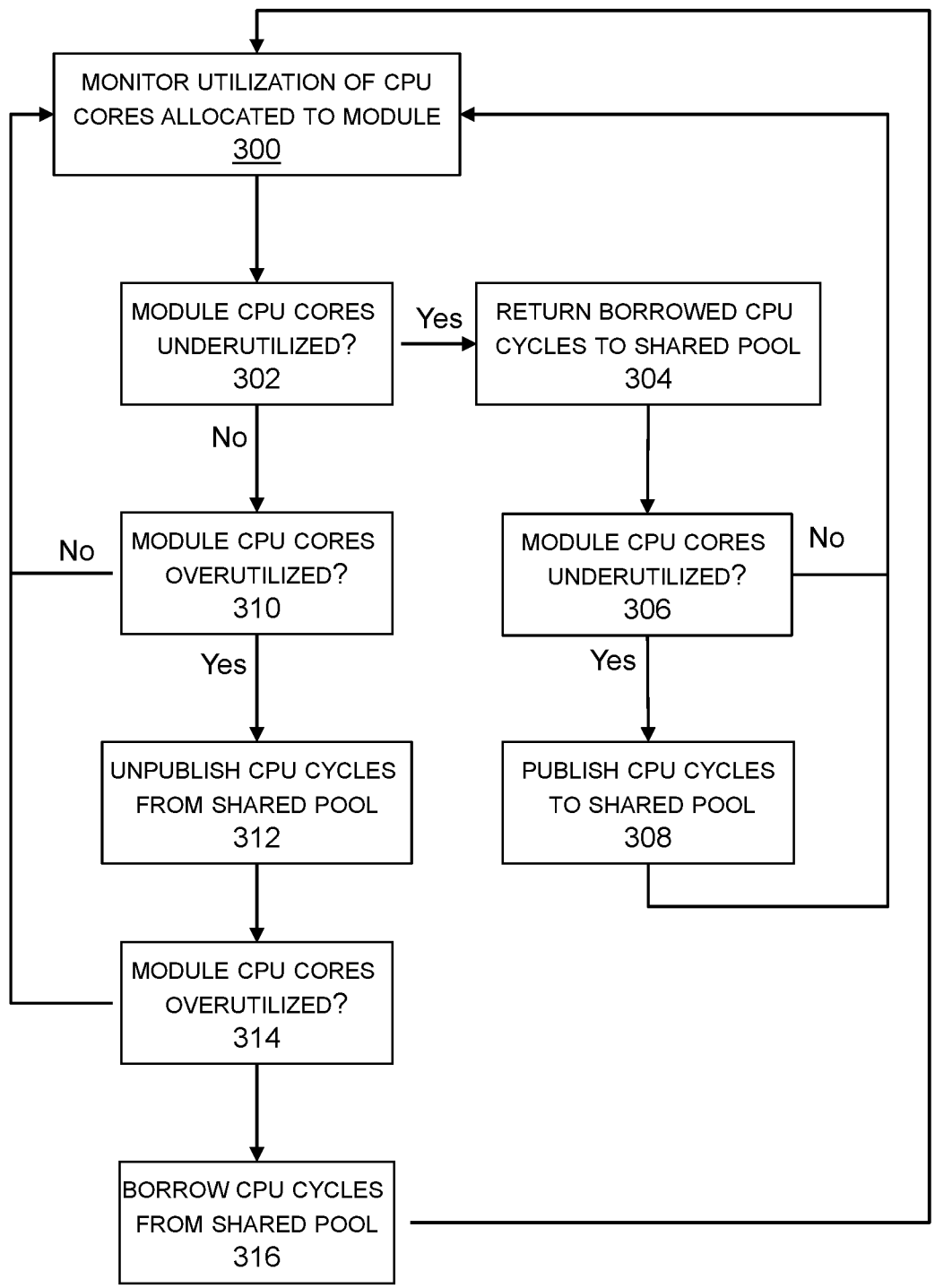
FIG. 3 illustrates a method for dynamic CPU core sharing among the emulation modules of one compute node.

FIG. 3 illustrates a method for dynamic CPU core sharing among emulation modules running on the same PCB. The method is implemented separately by each of the emulation modules. Step 300 is monitoring utilization of the CPU cores allocated to the emulation module. Step 302 is calculating whether any of those CPU cores are underutilized. Underutilization may be defined as a percentage of maximum capability, for example, and without limitation. If any of the CPU cores are underutilized, then borrowed CPU cycle units by this module from the shared pool are returned to the shared pool as indicated in step 304. The emulation module will not necessarily have any borrowed CPU cycle units to return to the shared pool. Step 306 is recalculating whether any of the CPU cores are underutilized. It is assumed that a thread scheduler will balance loading of the CPU cores being utilized so returning borrowed CPU cycle units will increase loading on the CPU cores allocated to the emulation module. If none of the CPU cores are underutilized, then monitoring continues in step 300. If CPU cores are still underutilized, then CPU cycle units are published to the shared pool for donation to other emulation modules as indicated in step 308.

If none of the CPU cores are underutilized as determined in step 302, then step 310 is calculating whether the CPU cores are overutilized. Overutilization may be defined as a percentage of maximum capability, for example, and without limitation. If the CPU cores are not overutilized, then monitoring continues in step 300. If CPU cores are overutilized, then CPU cycle units donated to the shared pool are unpublished as indicated in step 312. Unpublishing CPU cycle units from the shared pool causes borrowed CPU cycle units to be returned in order to prevent the number of borrowed CPU cycle units from exceeding the number of donated CPU cycle units. Step 314 is recalculating whether the CPU cores are overutilized. It is assumed that a thread scheduler will balance loading of the CPU cores being utilized, so recovering borrowed CPU cycle units will decrease loading on the CPU cores allocated to the emulation module. If the CPU cores are not overutilized, then monitoring continues in step 300. If CPU cores are still overutilized, then CPU cycle units are borrowed from the shared pool as indicated in step 316. The shared pool will not necessarily contain CPU cycle units that are available to be borrowed. The steps are performed iteratively by each of the emulation modules, so CPU cycle units are dynamically shared by being published, borrowed, returned, and unpublished as loading on individual emulation modules changes.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
at least one compute node configured to manage access to an array of non-volatile drives, the at least one compute node comprising at least one multi-core processor with a first set of cores that are allocated to an input-output (IO) services emulation module running on the compute node, a second set of cores that are allocated to a frontend emulation module running on the compute node, and a third set of cores that are allocated to a backend emulation module running on the compute node;
the IO services emulation module configured to monitor utilization of the first set of cores by the IO services emulation module and donate processing resources to a shared pool responsive to the first set of cores being underutilized by the IO services emulation module;
the frontend emulation module configured to monitor utilization of the second set of cores by the frontend emulation module and donate processing resources to the shared pool responsive to the second set of cores being underutilized by the frontend emulation module;
the backend emulation module configured to monitor utilization of the third set of cores by the backend emulation module and donate processing resources to the shared pool responsive to the third set of cores being underutilized by the backend emulation module;
the processing resources donated to the shared pool being accessible to the IO services emulation module, the frontend emulation module, and the backend emulation module for running threads.

2. The apparatus of claim 1 further comprising the IO services emulation module configured to donate central processing unit (CPU) cycle units to a shared pool responsive to the first set of cores being underutilized; the frontend emulation module configured to donate CPU cycle units to the shared pool responsive to the second set of cores being underutilized; the backend emulation module configured to donate CPU cycle units to the shared pool responsive to the third set of cores being underutilized.

3. The apparatus of claim 2 further comprising the IO services emulation module configured to return borrowed CPU cycle units to the shared pool responsive to the first set of cores being underutilized; the frontend emulation module configured to return borrowed CPU cycle units to the shared pool responsive to the second set of cores being underutilized; and the backend emulation module configured to return borrowed CPU cycle units to the shared pool responsive to the third set of cores being underutilized.

4. The apparatus of claim 3 further comprising the IO services emulation module configured to unpublish CPU cycle units from the shared pool responsive to the first set of cores being overutilized; the frontend emulation module configured to unpublish CPU cycle units from the shared pool responsive to the second set of cores being overutilized; and the backend emulation module configured to unpublish CPU cycle units from the shared pool responsive to the third set of cores being overutilized.

5. The apparatus of claim 4 further comprising the IO services emulation module configured to borrow CPU cycle units from the shared pool responsive to the first set of cores being overutilized; the frontend emulation module configured to borrow CPU cycle units from the shared pool responsive to the second set of cores being overutilized; and the backend emulation module configured to borrow CPU cycle units from the shared pool responsive to the third set of cores being overutilized.

6. The apparatus of claim 1 further comprising a data structure that indicates, for each of the emulation modules, a number of CPU cycle units donated by the emulation module to the shared pool and a number of the donated CPU cycle units that have been borrowed by the other emulation modules.

7. The apparatus of claim 1 further comprising the IO services emulation module configured to donate cores to a shared pool responsive to the first set of cores being underutilized; the frontend emulation module configured to donate cores to the shared pool responsive to the second set of cores being underutilized; the backend emulation module configured to donate cores to the shared pool responsive to the third set of cores being underutilized.

8. A method comprising:
allocating a first set of cores of a multi-core processor of a compute node of a storage system to an input-output (IO) services emulation module running on the compute node;
allocating a second set of cores of the multi-core processor to a frontend emulation module running on the compute node;
allocating a third set of cores of the multi-core processor to a backend emulation module running on the compute node;
monitoring, by the IO services emulation module, utilization of the first set of cores by the IO services emulation module and donating processing resources to a shared pool responsive to the first set of cores being underutilized by the IO services emulation module;
monitoring, by the frontend emulation module, utilization of the second set of cores by the frontend emulation module and donating processing resources to the shared pool responsive to the second set of cores being underutilized by the frontend emulation module; and
monitoring, by the backend emulation module, utilization of the third set of cores by the backend emulation module and donating processing resources to the shared pool responsive to the third set of cores being underutilized by the backend emulation module;
wherein the processing resources donated to the shared pool are accessible to the IO services emulation module, the frontend emulation module, and the backend emulation module for running threads.

9. The method of claim 8 further comprising the IO services emulation module donating central processing unit (CPU) cycle units to a shared pool responsive to the first set of cores being underutilized, the frontend emulation module donating CPU cycle units to the shared pool responsive to the second set of cores being underutilized, and the backend emulation module donating CPU cycle units to the shared pool responsive to the third set of cores being underutilized.

10. The method of claim 9 further comprising the IO services emulation module returning borrowed CPU cycle units to the shared pool responsive to the first set of cores being underutilized, the frontend emulation module returning borrowed CPU cycle units to the shared pool responsive to the second set of cores being underutilized, and the backend emulation module returning borrowed CPU cycle units to the shared pool responsive to the third set of cores being underutilized.

11. The method of claim 10 further comprising the IO services emulation module unpublishing CPU cycle units from the shared pool responsive to the first set of cores being overutilized, the frontend emulation module unpublishing CPU cycle units from the shared pool responsive to the second set of cores being overutilized, and the backend emulation module unpublishing CPU cycle units from the shared pool responsive to the third set of cores being overutilized.

12. The method of claim 11 further comprising the IO services emulation module borrowing CPU cycle units from the shared pool responsive to the first set of cores being overutilized, the frontend emulation module borrowing CPU cycle units from the shared pool responsive to the second set of cores being overutilized, and the backend emulation module borrowing CPU cycle units from the shared pool responsive to the third set of cores being overutilized.

13. The method of claim 8 further comprising a data structure indicating, for each of the emulation modules, a number of CPU cycle units donated by the emulation module to the shared pool and a number of the donated CPU cycle units that have been borrowed by the other emulation modules.

14. The method of claim 8 further comprising the IO services emulation module donating cores to a shared pool responsive to the first set of cores being underutilized, the frontend emulation module donating cores to the shared pool responsive to the second set of cores being underutilized, and the backend emulation module donating cores to the shared pool responsive to the third set of cores being underutilized.

15. A non-transitory computer-readable storage medium storing instructions that are executed by a storage system to perform a method comprising:
allocating a first set of cores of a multi-core processor of a compute node of a storage system to an input-output (IO) services emulation module running on the compute node;
allocating a second set of cores of the multi-core processor to a frontend emulation module running on the compute node;
allocating a third set of cores of the multi-core processor to a backend emulation module running on the compute node;
monitoring, by the IO services emulation module, utilization of the first set of cores by the IO services emulation module and donating processing resources to a shared pool responsive to the first set of cores being underutilized by the IO services emulation module;
monitoring, by the frontend emulation module, utilization of the second set of cores by the frontend emulation module and donating processing resources to the shared pool responsive to the second set of cores being underutilized by the frontend emulation module; and monitoring, by the backend emulation module, utilization of the third set of cores by the backend emulation module and donating processing resources to the shared pool responsive to the third set of cores being underutilized by the backend emulation module;

wherein the processing resources donated to the shared pool are accessible to the IO services emulation module, the frontend emulation module, and the backend emulation module for running threads.

16. The non-transitory computer-readable storage medium of claim 15 in which the method further comprises the IO services emulation module donating central processing unit (CPU) cycle units to a shared pool responsive to the first set of cores being underutilized, the frontend emulation module donating CPU cycle units to the shared pool responsive to the second set of cores being underutilized, and the backend emulation module donating CPU cycle units to the shared pool responsive to the third set of cores being underutilized.

17. The non-transitory computer-readable storage medium of claim 16 in which the method further comprises the IO services emulation module returning borrowed CPU cycle units to the shared pool responsive to the first set of cores being underutilized, the frontend emulation module returning borrowed CPU cycle units to the shared pool responsive to the second set of cores being underutilized, and the backend emulation module returning borrowed CPU cycle units to the shared pool responsive to the third set of cores being underutilized.

18. The non-transitory computer-readable storage medium of claim 17 in which the method further comprises the IO services emulation module unpublishing CPU cycle units from the shared pool responsive to the first set of cores being overutilized, the frontend emulation module unpublishing CPU cycle units from the shared pool responsive to the second set of cores being overutilized, and the backend emulation module unpublishing CPU cycle units from the shared pool responsive to the third set of cores being overutilized.

19. The non-transitory computer-readable storage medium of claim 18 in which the method further comprises the IO services emulation module borrowing CPU cycle units from the shared pool responsive to the first set of cores being overutilized, the frontend emulation module borrowing CPU cycle units from the shared pool responsive to the second set of cores being overutilized, and the backend emulation module borrowing CPU cycle units from the shared pool responsive to the third set of cores being overutilized.

20. The non-transitory computer-readable storage medium of claim 15 in which the method further comprises generating a data structure indicating, for each of the emulation modules, a number of CPU cycle units donated by the emulation module to the shared pool and a number of the donated CPU cycle units that have been borrowed by the other emulation modules.

\* \* \* \* \*